Figure 1:
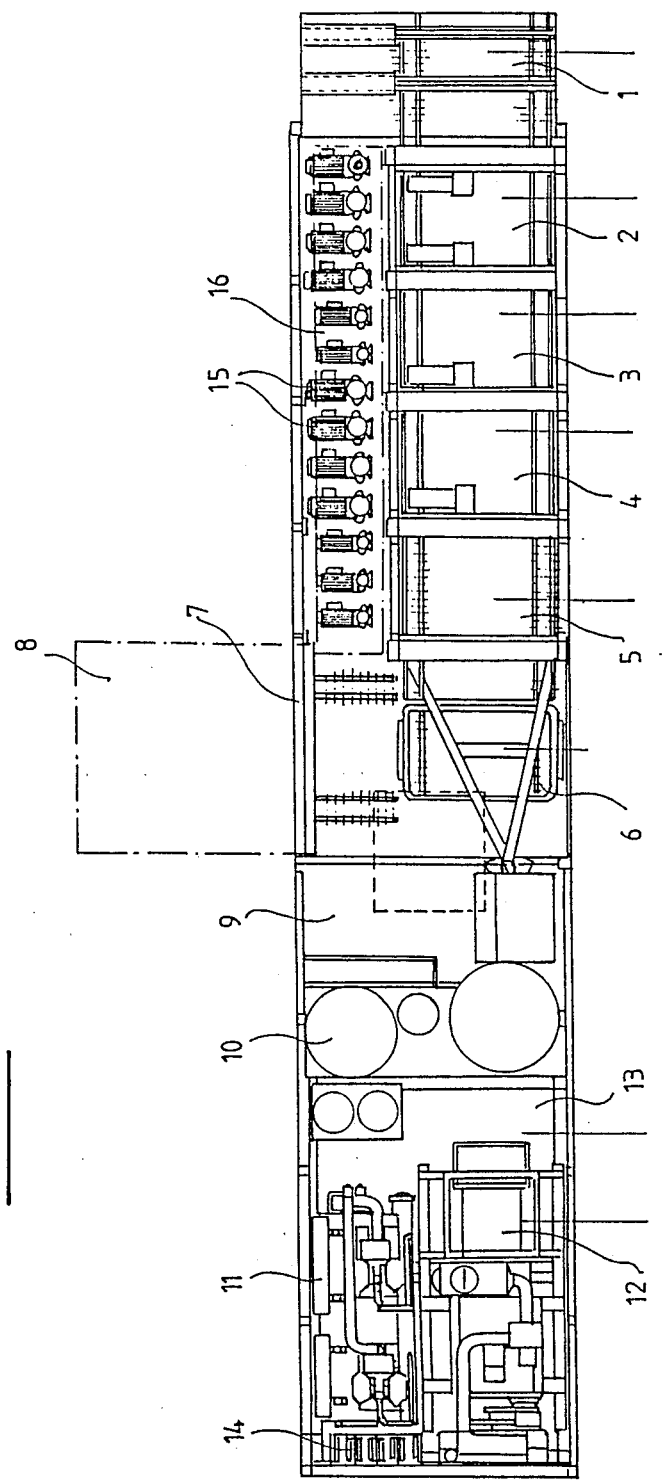

United States Patent [19]

Lara

[11] Patent Number: 4,888,960
[45] Date of Patent: Dec. 26, 1989

[54] REFRIGERATION UNIT FOR PRODUCE AND, IN PARTICULAR, FOR FRESH VEGETABLES

[75] Inventor: Jean Lara, Jaunay-clan, France

[73] Assignee: Igenov, Fortenay au Roses, France

[21] Appl. No.: 251,105

[22] Filed: Sep. 29, 1988

[30] Foreign Application Priority Data

Sep. 30, 1987 [FR] France .................. 87 13512

[51] Int. Cl.⁴ .............................................. F25D 19/00
[52] U.S. Cl. ............................................ 62/298; 62/78
[58] Field of Search .............................. 62/65, 78, 298

[56] References Cited

U.S. PATENT DOCUMENTS

| | | | |
|---|---|---|---|
| 2,766,598 | 10/1956 | Amiot | 62/65 |
| 2,968,933 | 1/1961 | Pfeifer et al. | 62/298 |
| 3,477,243 | 11/1969 | Schroeder et al. | 62/298 |
| 3,879,957 | 4/1975 | Wilson et al. | 62/298 |
| 4,380,908 | 4/1983 | Crabb, Jr. | 62/298 |
| 4,723,418 | 2/1988 | Whitmer, III | 62/298 |

Primary Examiner—Ronald C. Capossela
Attorney, Agent, or Firm—Helfgott & Karas

[57] ABSTRACT

Refrigeration unit for produce and, in particular for fresh vegetables, characterized in that it consists of at least two boxes (22) which receive the produce to be processed and are provided with means (32, 33, 41) conveying water and/or air, which for at least one of the boxes is refrigerated, onto this produce, these boxes being in alignment and being provided with opposing lateral openings (23, 24) permitting, by means of a horizontal displacement in a single direction, the introduction of the produce to be processed into the first box, its transfer from the first box towards the second and the removal of the processed produce from the second box, the openings in these boxes being provided with closure doors (25) sliding in the plane of these openings.

15 Claims, 6 Drawing Sheets

REFRIGERATION UNIT FOR PRODUCE AND, IN PARTICULAR, FOR FRESH VEGETABLES

The invention relates to a refrigeration unit for produce and, in particular, for fresh vegetables.

The unit is characterized in that it consists of at least two boxes which receive the produce to be processed and are provided with means conveying refrigerated water and/or air onto this produce, these boxes being in alignment and being provided with opposing lateral openings permitting, by means of a horizontal displacement in a single direction, the introduction of the produce to be processed into the first box, its transfer from the first box towards the second and the removal of the processed produce from the second box, the openings in these boxes being provided with closure doors sliding in the plane of these openings.

According to another characteristic of the invention, each box consists of a tunnel structure at each end of which there is provided a frame provided with a door sliding in its plane.

According to another characteristic of the invention, each box is provided at its base with means for the transfer of palettes for supporting the produce.

According to another characteristic of the invention, a drying module is aligned with the boxes, being arranged opposite the opening for removing the processed produce from the last box in the line, this drying module consisting of a support structure mounted so as to rotate on a vertical shaft and provided with means for the positioning of the produce during drying, means also being provided for conveying and then removing the processed produce emerging from the last box by means of a horizontal displacement.

According to another characteristic of the invention, the unit comprises a closed water supply circuit provided with a unit for refrigerating, treating and recycling the water.

According to another characteristic of the invention, the unit is arranged inside a vehicle, the wall of this vehicle being provided with slots for the passage of the doors sliding into an opening position.

Figure 2:
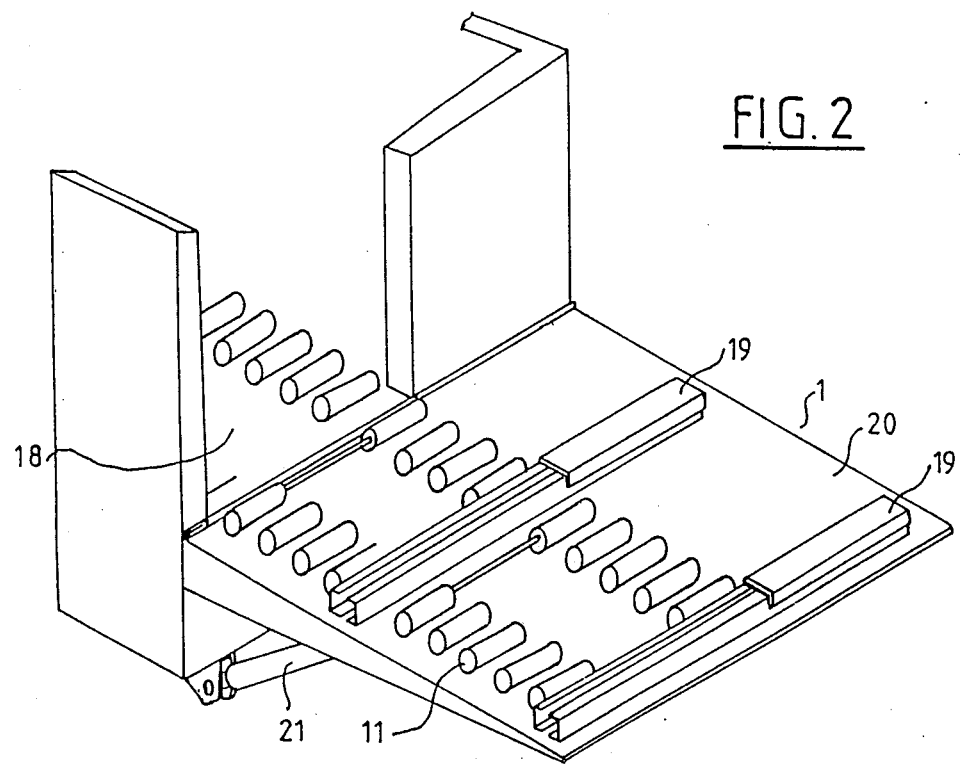
Figure 3:
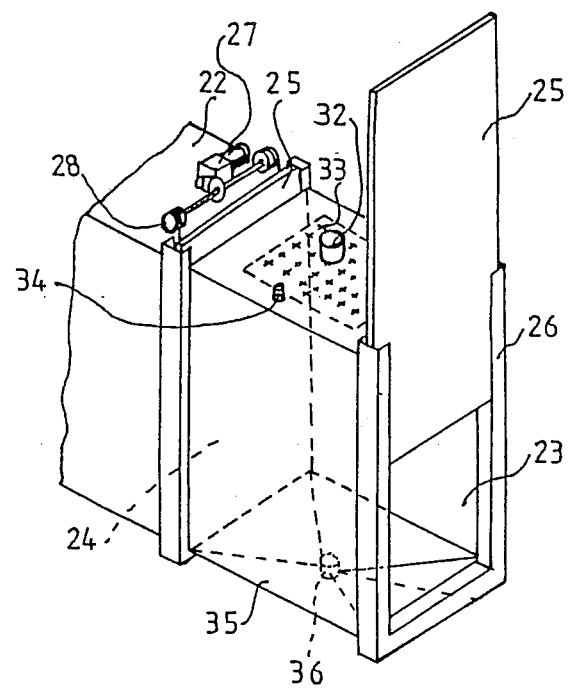
Figure 4:
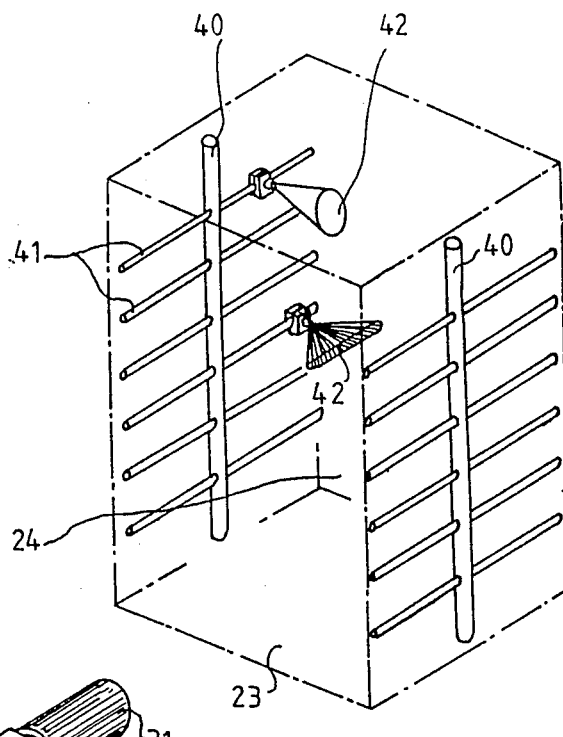
Figure 5:
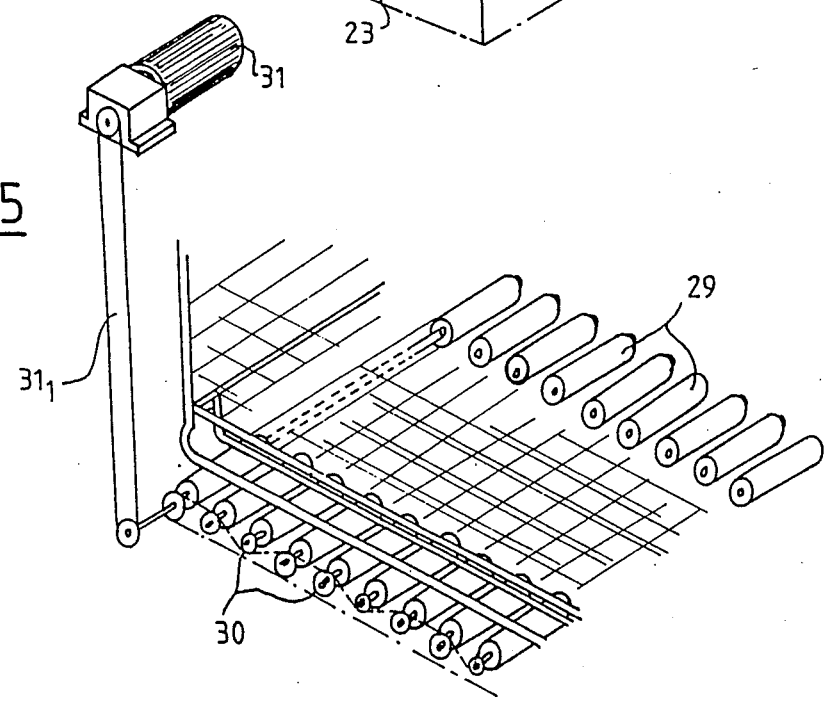
Figure 6:
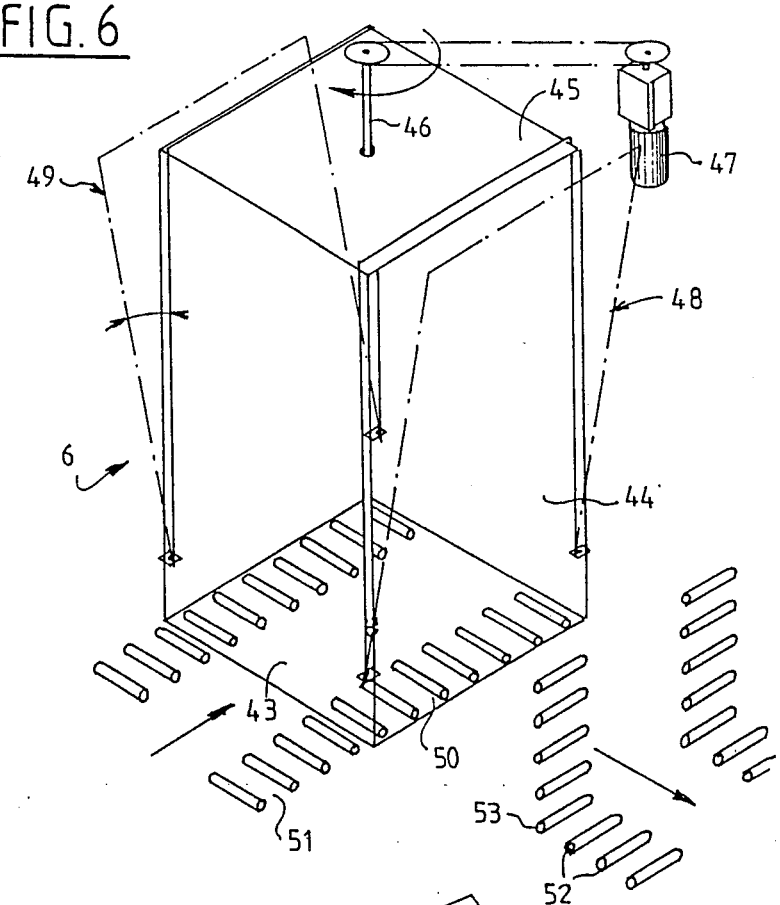
Figure 7:
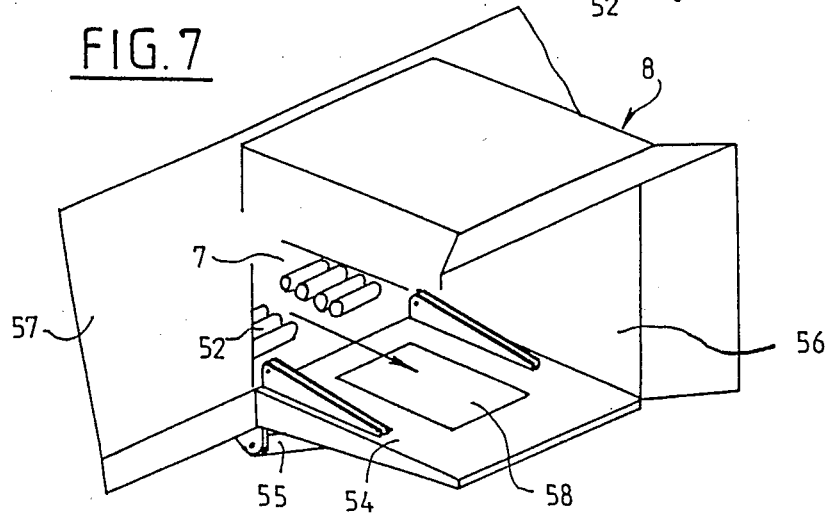
Figure 8:
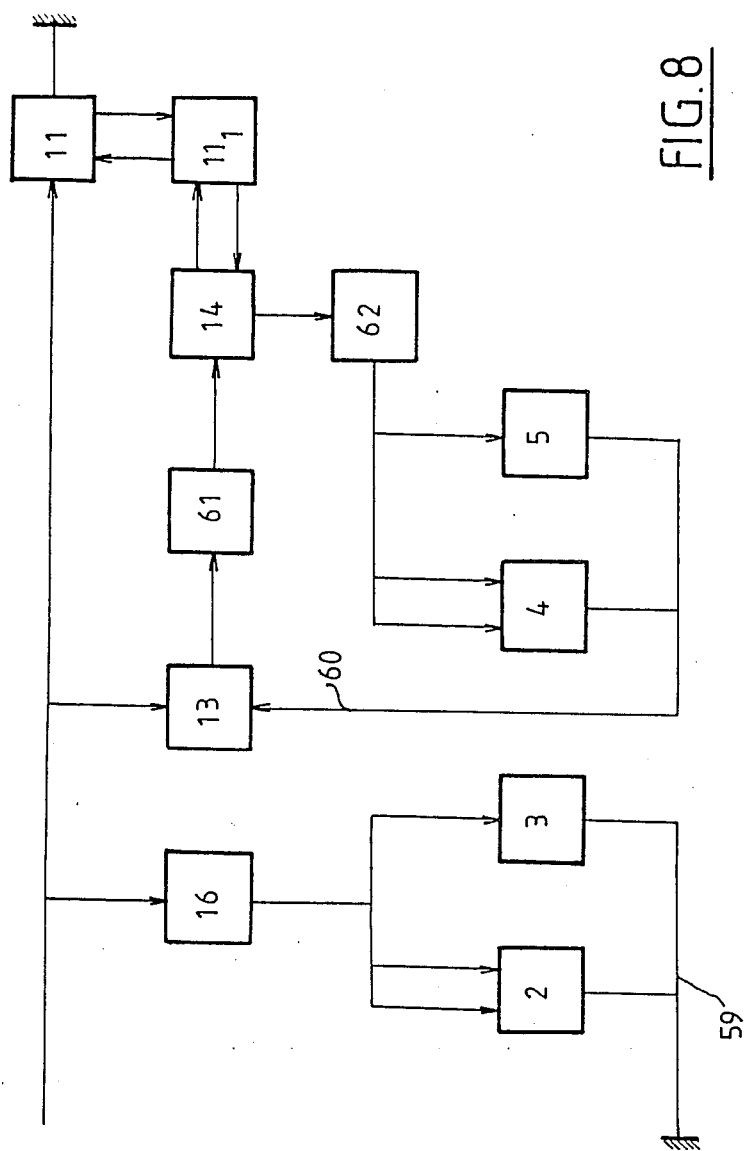
Figure 9:
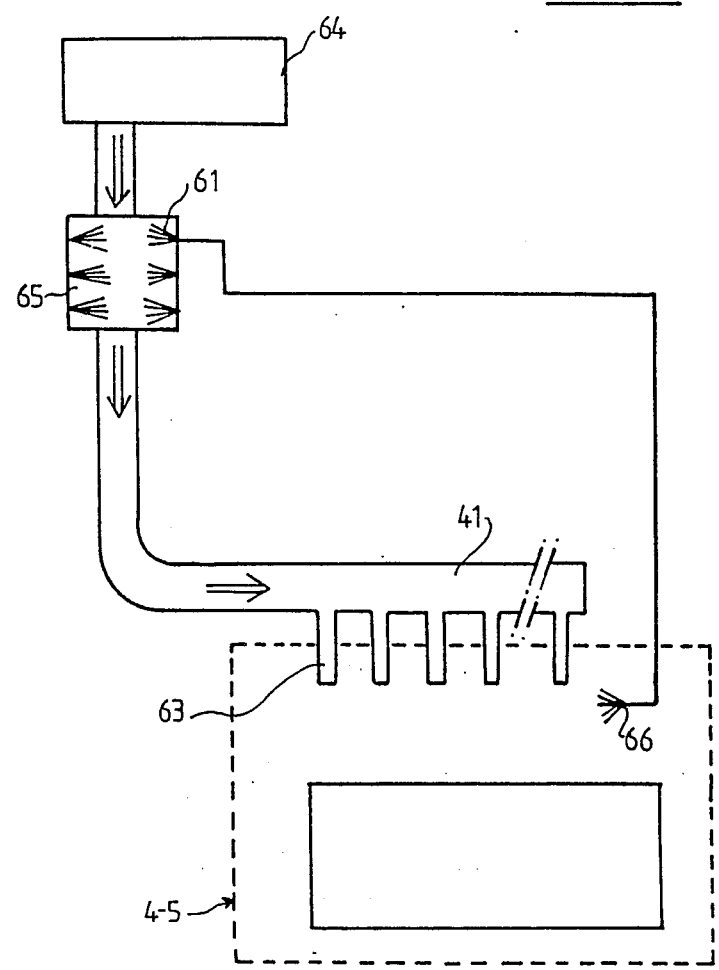

The invention is illustrated by way of nonlimiting example in the appended drawings, wherein:

FIG. 1 is a view in elevation of the overall vehicle according to the invention, FIG. 2 is a view in partial perspective illustrating the station for loading the produce to be processed, located at the rear of the vehicle, FIG. 3 is a view in perspective of two aligned and assembled boxes, FIG. 4 illustrates the devices for spraying water of one box, FIG. 5 illustrates, diagrammatically in perspective, the means provided in the boxes for the transfer of the produce, FIG. 6 is a view in diagrammatic perspective of the drying module located opposite the last box in the line, FIG. 7 is a view in diagrammatic perspective of the opening located on one of the sides of the vehicle for the removal of the processed produce, FIG. 8 illustrates the water circuit of the vehicle, supplying the various boxes, FIG. 9 is the basic diagram of a modified water-supply circuit for the boxes for processing the produce.

The present invention therefore aims to provide a unit which ensures the processing of agricultural foodstuff produce, particularly in the area of fruits, vegetables and flowers, by performing a washing and a prerefrigeration of this produce automatically and on the actual harvest site.

The unit (see FIG. 1) is installed on the platform of a road vehicle which comprises, to this end, the assembly of the elements necessary for the automatic transfer and for the processing of the produce, arranged, for example, on palettes, this vehicle also being provided with drive members which make it independent, so that in order to be used, all that is needed is an available external water source.

The vehicle according to the invention is constructed so as to ensure the continuous circulation of the produce to be processed after their gathering and up to their loading into refrigerator lorries, after processing, without interrupting the chain of cold.

The containers receiving the produce to be processed are therefore automatically loaded on to an entry platform in order to be processed continuously according to a cycle defined by the user on a control desk. Once the processing cycle is complete, the containers are removed into a tunnel opposite which there stands a refrigerator lorry which is thereby loaded with the processed produce and which transports them.

The vehicle illustrated in FIG. 1 therefore comprises an entry and loading platform 1 located at the rear of the vehicle, four aligned module 2, 3, 4 and 5 for processing the produce, these modules ensuring, with the help of module 2, the preliminary washing of the produce by immersion or spraying; with respect to module 3, the rinsing by spraying; with respect to the module 4, the prerefrigeration by immersion or spraying ; with respect to the module 5, the prerefrigeration by spraying. A drying module 6 is arranged in line with these modules and on the side of the exit opening for the processed produce, the exit opening for the produce from this drying module being arranged in front of the lateral opening 7 of the vehicle opposite which the tunnel 8 is placed making it possible to convey the processed produce into a refrigerator lorry.

The front part of the vehicle, that is to say that which is located beyong the opening 7 with respect to the loading area 1, is diagrammatically provided with a command and control station 9, devices 10 for treating the water, a refrigeration unit 11, a generating set 12, a tank 13 of untreated water and a tank 14 of treated water.

Pumps 15 supplying water to the various modules are provided at the side of the modules 2, 3, 4 and 5. A preliminary washing water tank 16 is arranged above these pumps, this water being intended for the prewashing module 2 and for the rinsing module 3.

The loading station 1 (see FIG. 2) is supplied with containers by an operator having available a lifting carriage which places two sets of two superimposed palettes (not shown) side by side. The first set is placed on motorized rollers 17 located opposite the rear opening 18 of the vehicle so as to permit the introduction of this first set of palettes inside the preliminary washing box whose entry opening is contiguous with the opening 18. The second set of palettes is placed in a waiting position on retractable transfer rails 19 so as to be able to take the place of the first set one the latter has been loaded into the processing cycle. This loading station 1 is installed on a back door 20 mounted so as to pivot at the rear of the vehicle. Jacks 21 are provided for placing this back door 20 in a vertical position against the opening 18 when the vehicle is not used for processing produce and must, on the contrary, be moved by road.

The modules 2, 3, 4 and 5 which have an identical structure each consist (see FIG. 3) of a metal tunnel 22 provided with two opposed lateral openings 23 and 24 equipped with doors 25 sliding in the plane of these openings and defining, when they are closed, leak-tight boxes inside the tunnels 22.

In the example illustrated, these doors 25 slide vertically in frames 26 provided with guide grooves and a leak-tight seal. These frames are provided with means providing their mounting either at one end of a tunnel or between two adjacent tunnels in order to form a series of leak-tight boxes separated from one another by a vertically sliding door.

Slots are provided in the roof of the lorry to permit the passage of doors 25 when they are placed in an open position. The opening and the closing of the doors is achived, for each module, by means of a gear motor 27 which is connected by pulleys and cables 28 to the lower area of the doors.

Each processing tunnel is equipped at its lower part (see FIG. 5) with two rows of metal rollers 29 driven in rotation by a set of pinions and chains 30 in order to ensure the introduction of a container into the first module and then to drive the containers from one processing module to the following module and, finally, to remove the container from the last module. The drive of these rollers of each of the boxes is provided by a gear motor 31 located outside and in the top part of the box in order to drive via a pinion and chain transmission 31, the rollers 29 which are located inside and in the bottom part of the box.

Sensors (not shown) are provided inside the boxes in order to detect the presence of the container of produce to be processed and to cut the supply of the gear motor when it occupies a correct position.

It will be noted therefore that, by means of this construction of the aligned boxes provided with leak-tight opposing doors, it is possible to move the produce to be processed horizontally from one box to the following box and all this is done in a continuous processing cycle, the processing operations performed in one of the boxes being independent of the processing operations performed in the adjacent boxes by virtue of the leak-tight doors.

The automatic opening and closing of the doors and the supply to the gear motors 27 will be achieved according to a programmed cycle.

The upper part of the boxes receives a large flow central water inlet 32 provided with an antisplash plug 33 consisting of an enclosure with a perforated base occupying the greater part of the top part of each box. This anti-splash plug 33 permits a rapid immersion of the produce without damage thereto.

These boxes are also provided with two lateral water inlets 34 supplying spraying circuits.

The base 35 of the boxes is produced in the form of a tunnel and comprises a water-removal opening 36 provided with a closure stopper and with a strainer. This plug (not shown) is associated with a drive member commanding its opening or its closing as a function of the programmed command cycle.

In FIG. 4, a diagrammatic illustration has been given of the water spraying devices arranged inside each box. This device consists of two assemblies placed laterally against the inner wall of the tunnel between the inlet opening 23 and the outlet opening 24 for the produce, these assemblies comprising a vertical central collector 40 to which horizontal ramps 41 are connected and which support interchangeable spraying nozzles 42. The form of the jet of these nozzles is adapted to the nature of the produce to be processed.

Preferably, each box forming a processing module comprises all the devices permitting processing by immersion and by spraying, the user in each case programming the operation according to the produce to be processed and the result to be obtained.

The processing cycle through a unit comprising four boxes will preferably be as follows:

The first box (module No. 2) will ensure the washing of the produce by immersion of spraying according to the choice of the user; the second box (module No. 3) will perform a rinsing by spraying, the water used in these two boxes not being pretreated and being removed after use.

On the other hand, the last two boxes (modules No. 4 and 5) will ensure the cooling of the produce by spraying or immersion for module No. 4 and by a fine rain for the module No. 5, the water used in these last two boxes being treated and refrigerated water circulating in a closed circuit.

The exit opening 24 of the last of the aligned boxes (module No. 5) is arranged opposite a drying station (see FIG. 6) which is provided with an entry opening 43 for the produce to be dried and with an exit opening 44 for the dried produce, these openings being arranged perpendicularly with respect to each other in a manner such that the opening 43 is located opposite the exit opening of the last of the aligned boxes whilst the opening 44 is located opposite the lateral opening 7 of the vehicle.

This drying station consists of a structure 45 mounted in rotation via sections of an upper and lower shaft 46. A gear motor 47 is provided to drive the structure 45 in rotation, the speed of rotation being sufficiently great to remove the water from the produce under the action of centrifugal force.

This structure is equipped with two opposite arms 48, 49 which grip concentrically and are intended to immobilise the set of superimposed containers.

The base of this drying station is provided with rollers 50 for the introduction and the exit of the containers whilst, opposite the introduction opening 43 and the exit opening 44 sets of transfer rollers 51, 52 are provided which are mounted so as to pivot on axes 53 in order to be placed in a vertical position to allow the rotation of the drying station.

The exit opening 44 for the dried produce and the roller transfer means 52 are arranged opposite the lateral opening 7 and the tunnel 8.

A back door 54 which may be lifted by the action of jacks 55 is provided in front of the opening 7. The tunnel 8, made from a flexible insulating material providing a leak-tight connection between the body work 57 of the vehicle and a refrigerator lorry for transporting the processed produce is arranged above this back door.

Preferably, the back door is provided with a weighing device 58 for weighing the processed produce.

The vehicle's water circuit, which supplies the boxes, is illustrated in FIG. 8.

The water needed for the preliminary washing in the boxes of modules 2 and 3 originates from the buffer tank 16 supplied by a pumping station, the water used being removed by the piping 59, for example into a settling tank.

The water needed for the prerefrigeration of the produce in the boxes of modules 4 and 5 originates from a tank 14 in which the water is continually cooled by virtue of circulation through an exchanger $11_1$ connected to a refrigerating set 11. Before arriving in this cooling tank 14, the water originating from the pumping station passes through a buffer reservoir 13. Piping 60 also leads into this tank and recovers the water used in the modules 4 and 5 in order to recycle it.

The water originating from the pumping station or the recycled water originating from the modules 4 and 5 is conveyed to the tank 14 by a processing assembly 61 which comprises:

- a preliminary filtering removing the largest particles in suspension in the water via a whirling process;
- sand filters intended to retain the impurities not removed by the preliminary filtering through layers of sand of different particle sizes;
- pocket filters consisting of interchangeable disposable pockets providing the filtering of the last very fine particles remaining in the water.

Before being conveyed into the modules 4 and 5, the water emerging from the tank 14 passes through a stage 62 for removing bacteria, employing an ultra violet radiation sterilizer.

The exchanger $11_1$ is preferably based on the principle of a water/water heat pump. It receives the quantity of water needed for its operation from a buffer tank and then removes it on to land where it can be used to irrigate adjacent crops.

It will be noted that, in the unit described, the prerefrigeration modules 4 and 5 act by immersing the produce in refrigerated water or by spraying with refrigerated water. However, it will be noted that spraying of the products may be performed by placing them in contact with refrigerated damp air and not with cold water. In order to do this (see FIG. 9), the spraying ramps 41 comprise nozzles 63 which issue cold and damp air. In this case, the vehicle comprises a controlled-air plant 64 providing the filtering of the ambient air in order to obtain air of very good bacteriological quality which is pulsed through a very fine mist of treatted water formed in an enclosure 65. The air which is charged with water droplets is then conveyed by the ramps 41 onto the produce to be processed. It is also possible to employ a second air humidification assembly consisting in spraying another mist of treated water in front of the air intakes 63 inside the boxes via nozzles 66.

I claim:

1. Refrigeration unit for produce, in particular for fresh vegetables, comprising at least two boxes which receive the produce to be processed and are provided with means for conveying a flow medium, which for at least one of the boxes is refrigerated, onto said produce, said boxes being positioned side by side in alignment with each other and being provided with opposing lateral openings provided with closure doors sliding in a plane of said openings to open and close said openings; and means for a horizontal displacement in a single direction of said produce for the introduction of the produce to be processed into a first box, its transfer from the first box towards a second box and the removal of the processed produce from the second box, said openings when open, permitting said introduction, said transfer and said removal of said produce being processed in the unit.

2. Unit according to claim 1 wherein each box consists of a tunnel structure at each end of which there is provided a frame provided with said closure door sliding in a plane thereof.

3. Unit according to claim 2, wherein said frame is provided with means permitting its assembly both at one end of a tunnel of said structure and between two adjacent openings of the tunnels of said two boxes.

4. Unit according to claim 3, wherein said doors are mounted so as to slide vertically and in the closed position form leak-tight doors.

5. Unit according to claim 4, further including a drying module aligned with said boxes and arranged opposite the opening for removing the processed produce from a last box in a line, said drying module consisting of a support structure mounted so as to rotate on a vertical shaft and provided with means for positioning the produce during drying, and means for conveying the produce in said drying module and removing the processed produce emerging from the last box in a horizontal displacement.

6. Unit according to claim 5, wherein additional transfer means are provided opposite an opening for introduction and removal of the produce and of the drying module, said additional transfer means being at lest partly movable in order to interrupt the connection thereof with the drying module during drying.

7. Unit according to claim 4, wherein said means for the introduction, transfer and removal of said produce are provided at a base of each box.

8. Unit according to claim 4, wherein each box is provided in an upper area thereof with an enclosure with a perforated horizontal base into which a supply conduit for said medium debouches, said base covering a greater part of an inner section of the box.

9. Unit according to claim 7, wherein each box is provided, outside and in a top part thereof, with an electric motor connected via a transmission member to said means for introduction, transfer and the removal of the produce arranged inside the box in a bottom part thereof.

10. Unit according to claim 1, wherein said medium is water.

11. Unit according to claim 10, and further comprising a water supply circuit provided with a unit for refrigerating, treating and recycling the water.

12. Unit according to claim 1, wherein said medium is air.

13. Unit according to claim 1, wherein the unit arranged inside a vehicle, and wherein a wall of the vehicle is provided with slots for a passage of said doors sliding into an open position.

14. Unit according to claim 13, wherein the vehicle is provided with a rear opening opposite the opening for the introduction of the produce to be processed into a first of said aligned boxes, and further comprising a drying module located opposite the last of the aligned boxes and having a first opening for the introduction of the produce to be dried and a second opening for the exit of the dried produce, said first and second openings being perpendicular to each other, and an exit opening for the dried produce being located opposite an opening provided in one of lateral sides of the vehicle.

15. Refrigeration unit for produce, in particular for fresh vegetables, arranged inside a vehicle and comprising at least two boxes which receive the produce to be processed and are provided with means conveying a flow medium, which for at least one of the boxes is refrigerated, onto said produce, said boxes being positioned side by side in alignment with each other and being provided with opposing lateral openings provided with closure doors sliding in a plane of said openings to open and close said openings; and means for a horizontal displacement in a single direction of said produce for the introduction of the produce to be processed into a first box, its transfer from the first box towards a second box and the removal of the processed produce from the second box, said openings when open, permitting said introduction, said transfer and said removal of said produce being processed in the unit, said vehicle having a wall provided with slots for a passage of said doors sliding into an open position.

* * * * *